United States Patent
Sasa

(10) Patent No.: US 8,846,298 B2
(45) Date of Patent: Sep. 30, 2014

(54) WRITE-ONCE-READ-MANY OPTICAL DISK HAVING LOW-TO-HIGH RECORDING PROPERTY ACCOMMODATING SHORT WAVELENGTH RECORDING

(75) Inventor: Noboru Sasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/941,451

(22) Filed: Nov. 8, 2010

(65) Prior Publication Data

US 2011/0116353 A1  May 19, 2011

Related U.S. Application Data

(62) Division of application No. 11/191,116, filed on Jul. 28, 2005.

(51) Int. Cl.
*G11B 7/24*  (2013.01)
*G11B 7/258*  (2013.01)
*G11B 7/24035*  (2013.01)
*G11B 7/0045*  (2006.01)
*G11B 7/257*  (2013.01)
*G11B 7/247*  (2013.01)

(52) U.S. Cl.
CPC .... G11B 7/24035 (2013.01); *G11B 2007/2571* (2013.01); G11B 7/00456 (2013.01); *G11B 2007/25706* (2013.01); *G11B 7/258* (2013.01); G11B 7/00455 (2013.01); *G11B 2007/25716* (2013.01); *G11B 2007/25715* (2013.01); G11B 7/24 (2013.01); *G11B 2007/24705* (2013.01)
USPC ........... 430/270.18; 430/270.15; 430/270.21; 428/64.8; 369/283

(58) Field of Classification Search
None
See application file for complete search history.

(56) References Cited

U.S. PATENT DOCUMENTS

| | | | | |
|---|---|---|---|---|
| 4,195,312 A | * | 3/1980 | Bell et al. | 369/284 |
| 4,412,231 A | * | 10/1983 | Namba et al. | 346/135.1 |
| 5,090,009 A | * | 2/1992 | Hamada et al. | 369/284 |
| 5,236,755 A | * | 8/1993 | Howe et al. | 428/64.4 |
| 5,238,722 A | | 8/1993 | Yashiro et al. | |
| 5,428,599 A | * | 6/1995 | Yashima et al. | 369/283 |
| 5,677,025 A | | 10/1997 | Tomura et al. | |
| 5,863,703 A | | 1/1999 | Tomura et al. | |
| 5,939,163 A | | 8/1999 | Ueno et al. | |
| 5,998,093 A | | 12/1999 | Tomura et al. | |

(Continued)

FOREIGN PATENT DOCUMENTS

| | | | |
|---|---|---|---|
| EP | 398255 | * | 11/1990 |
| EP | 1260973 | * | 11/2002 |

(Continued)

OTHER PUBLICATIONS

Translation of JP-06-044608(Feb. 1994).*

(Continued)

*Primary Examiner* — Martin Angebranndt
(74) *Attorney, Agent, or Firm* — Oblon, Spivak, McClelland, Maier & Neustadt, L.L.P.

(57) ABSTRACT

A write-only-read-many type optical recording medium includes a substrate, an organic material layer having a light absorption function that is sufficient for recording in the recording/reproduction wavelength range, the organic material layer being situated on the substrate, and a reflection layer being situated on the organic material layer. The recording medium is configured to have a Low-to-High recording property and record with a laser having a wavelength that is no greater than 500 nm.

12 Claims, 6 Drawing Sheets

(56) References Cited

U.S. PATENT DOCUMENTS

| | | | |
|---|---|---|---|
| 6,057,020 A | 5/2000 | Ueno et al. | |
| 6,194,121 B1 * | 2/2001 | Namba et al. | 430/270.19 |
| 6,197,477 B1 | 3/2001 | Satoh et al. | |
| 6,225,022 B1 | 5/2001 | Tomura et al. | |
| 6,258,509 B1 | 7/2001 | Usami et al. | |
| 6,554,972 B1 * | 4/2003 | Ichihara et al. | 204/192.26 |
| 6,628,595 B1 | 9/2003 | Sasa et al. | |
| 6,933,032 B2 | 8/2005 | Sasa et al. | |
| 2003/0048726 A1 | 3/2003 | Sasa | |
| 2003/0150340 A1 | 8/2003 | Yamamoto et al. | |
| 2004/0027959 A1 | 2/2004 | Sasa et al. | |
| 2004/0042381 A1 * | 3/2004 | Miyamoto et al. | 369/275.4 |
| 2004/0240374 A1 | 12/2004 | Tajima et al. | |
| 2004/0265532 A1 | 12/2004 | Sasa et al. | |
| 2005/0226135 A1 | 10/2005 | Morita et al. | |
| 2006/0068326 A1 | 3/2006 | Mikoshiba et al. | |
| 2006/0132585 A1 | 6/2006 | Van Brocklin et al. | |
| 2007/0030795 A1 | 2/2007 | Kikuawa et al. | |
| 2007/0054084 A1 | 3/2007 | Shiozaki et al. | |

FOREIGN PATENT DOCUMENTS

| | | | |
|---|---|---|---|
| JP | 06-044608 | * | 2/1994 |
| JP | 06044608 | | 2/1994 |
| JP | 06150380 | | 5/1994 |
| JP | 11-58955 | | 3/1999 |
| JP | 11-221964 | | 8/1999 |
| JP | 11-334206 | | 12/1999 |
| JP | 2000-43423 | | 2/2000 |
| JP | 2000-108513 | | 4/2000 |
| JP | 2000-113504 | | 4/2000 |
| JP | 2000-149320 | | 5/2000 |
| JP | 2000-158818 | | 6/2000 |
| JP | 2000-218940 | | 8/2000 |
| JP | 2000-222771 | | 8/2000 |
| JP | 2000-222772 | | 8/2000 |
| JP | 2000-280620 | | 10/2000 |
| JP | 2000-280621 | | 10/2000 |
| JP | 2000-335110 | | 12/2000 |
| JP | 2000-343824 | | 12/2000 |
| JP | 2000-343825 | | 12/2000 |
| JP | 2001-39034 | | 2/2001 |
| JP | 2001-146074 | | 5/2001 |
| JP | 2001-158865 | | 6/2001 |
| JP | 2001-181524 | | 7/2001 |
| JP | 2001-307375 | * | 11/2001 |
| JP | 20002-74740 | | 3/2002 |
| JP | 2003-263778 | * | 9/2003 |
| JP | 2004-213774 | * | 7/2004 |
| JP | 2005-131816 | * | 5/2005 |
| WO | WO 2004/038502 | | 5/2004 |
| WO | WO 2005/036541 | | 4/2005 |

OTHER PUBLICATIONS

Translation of JP-06044608 (Feb. 1994).

* cited by examiner

WRITE-ONCE-READ-MANY OPTICAL DISK HAVING LOW-TO-HIGH RECORDING PROPERTY ACCOMMODATING SHORT WAVELENGTH RECORDING

CROSS-REFERENCE TO RELATED APPLICATIONS

This application is a Divisional of U.S. application Ser. No. 11/191,116, filed Jul. 28, 2005, pending, the entire contents of which are hereby incorporated by reference.

BACKGROUND OF THE INVENTION

1. Field of the Invention

The present invention generally relates to a write-once-read-many (WORM) optical disk, and more particularly to a write-once-read-many optical disk being able to perform high density recording in a wavelength range that is no greater than blue laser wavelength.

2. Description of the Related Art

In recent years and continuing, development of blue laser, which enables ultra-high density recording, is rapidly growing. Furthermore, write-once-read-many type optical disks are being developed along with the rapid development of blue laser.

In the conventional write-once-read-many type optical disk, a laser beam is irradiated to a recording layer formed of an organic material so as to form recording pits in the recording layer (the recording pits mainly formed by change of refractive index created by decomposition/alteration of the organic material). Accordingly, the optical constant and decomposition behavior of the organic material used in the recording layer are important elements for forming satisfactory recording pits.

It is, therefore, necessary to select a material having suitable optical property with respect to blue laser wavelength and decomposition behavior. That is, for the purpose of increasing reflectivity in an unrecorded state, and/or for the purpose of creating a considerable change of refractive index by decomposing the organic material by irradiating laser thereto (thereby obtaining a large degree of modulation), the recording/reproduction wavelength is selected so that it is situated at a bottom of a long wavelength side of a large absorption band.

This is because the bottom toward the long wavelength side of the large absorption band of the organic material is a wavelength area in which a suitable absorption coefficient and a large refractive index can be obtained.

Nevertheless, with respect to blue laser wavelength, there is hardly any organic material providing an optical property with a value equivalent to that of a conventional recording layer. In order to obtain an organic material having an absorption band in the vicinity of the blue laser wavelength, the molecular structure is to be reduced or its conjugated system is to be shortened. This, however, leads to decrease of absorption coefficient (light absorption function), that is, decrease of refractive index.

In other words, although there are many organic materials having absorption bands in the vicinity of the blue laser wavelength range and although it is possible to control absorption coefficient, such organic materials do not have a large refractive index and are unable to attain a sufficient modulation degree (degree of modulation).

Patent Documents 1-5 (corresponding to Japanese Laid-Open Patent Application Nos. 2001-181524, 2001-158865, 2000-343824, 2000-343825, and 2000-335110) are examples showing the organic materials used for blue laser. However, in the embodiments of these documents, merely the solution and spectrum of the thin film are measured. There is no description regarding a recording/reproduction operation in these documents.

Although there are some descriptions regarding recording/reproduction in the embodiments of Patent Documents 6-8 (corresponding to Japanese Laid-Open Patent Application Nos. 11-221964, 11-334206, and 2000-43423), the recording wavelength thereof is 488 nm. Furthermore, the documents do not describe the conditions for recording or the density of recording but merely describe that satisfactory recording pits can be formed.

Although there are some descriptions regarding recording/reproduction in the embodiment of Patent Documents 9 (corresponding to Japanese Laid-Open Patent Application No. 11-58955), the recording wavelength thereof is 430 nm. Furthermore, the document do not describe the conditions for recording or the density of recording but merely describe that satisfactory degree of modulation can be obtained.

Furthermore, although a recording wavelength of 430 nm and a NA of 0.65 are described in the embodiments of Patent Documents 10-19 (corresponding to Japanese Laid-Open Patent Application Nos. 2001-39034, 2000-149320, 2000-113504, 2000-108513, 2000-222772, 2000-218940, 2000-222771, 2000-158818, 2000-280621, and 2000-280620), the recording is conducted with a low recording density (same recording density as DVD) in which the shortest pit is 0.4 µm.

Although a recording/reproduction wavelength of 405-408 nm is described in the embodiment of Patent Document 20 (corresponding to Japanese Laid-Open Patent Application No. 2001-146074), the embodiment does not specifically describe the recording density, but merely describes a low recording density in which 14T-EFM signals are used for recording.

Therefore, the above-described documents show that there is hardly any organic material that is able to provide an optical constant equal to the optical constant desired for a recording layer of a conventional write-only-read-many optical disk, in the vicinity of the 405 nm (center area of the oscillation wavelength of the blue semiconductor laser employed in current practical use).

Furthermore, there is no example which clearly defines the recording conditions in the vicinity of a wavelength of 405 nm and records with a recording density higher than that of DVD.

Furthermore, in a write-only-read-many optical disk employing a conventional organic material, the main absorption band of the organic material is situated in the vicinity of the recording/reproduction wavelength. Therefore, the dependency of the optical constant of the organic material with respect to wavelength becomes greater (thereby causing complex refractive index $\delta n$ and/or $\delta k$ to change considerably even when there is only a slight change of wavelength $\delta \lambda$, see FIG. 1). Therefore, this leads to a problem where reflectivity, and recording characteristics, such as recording sensitivity, modulation degree, jitter, and error rate to change considerably when change of recording/reproduction wavelength occurs due to, for example, individual differences amongst lasers or change in ambient temperature.

Meanwhile, from the aspect of reducing the cost and energy for developing pigments, Patent Document 21 (corresponding to Japanese Laid-Open Patent Application No. 2002-74740), describes an optical recording medium having a pigment with a maximum absorption that is situated toward a long wavelength compared to the wavelength of light beam employed for writing. However, the difference between this example and the present invention is described below.

Conventionally, it is typical for a write-only-read-many optical disk to have a High-to-Low recording property. Therefore, it is necessary to select an organic material, such as a pigment capable of providing a complex refractive index that is substantially equal to that of a conventional recording layer. However, since the typical organic material for short wavelength has a small molecular structure, there are few parts to which a substituent having a donor/acceptor effect can be applied. Furthermore, even in a case where the molecular structure is large, the substituent is unable to sufficiently provide the donor/acceptor effect since the conjugated system is short.

Therefore, in a case of a recording/reproduction wavelength area that is no greater than that of a blue laser, it is extremely difficult to obtain a complex refractive index that is substantially equal to that of a red laser wavelength area. Furthermore, even if there is an organic material that is able to provide a complex refractive index that is substantially the same as that of the red laser wavelength area, it is extremely difficult to optimize the complex refractive index of the organic material to the recording/reproduction wavelength.

Furthermore, in a conventional exemplary case of realizing a High-to-Low recording property, the absorption band of the organic material layer is set to be situated toward the short wave side with respect to the recording/reproduction wavelength range, and the recording/reproduction wavelength is set to be situated at the bottom of the absorption band of the organic material layer. However, under these conditions, there is a problem in which the organic material layer requires to be designed in accordance with the selection of the recording/reproduction wavelength and a problem in which the recording/reproduction property considerably changes with respect to the change in the wavelength of the laser during recording/reproduction.

SUMMARY OF THE INVENTION

It is a general object of the present invention to provide a write-once-read-many optical recording medium that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a write-once-read-many optical recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a write-only-read-many type optical recording medium including: a substrate; an organic material layer having a light absorption function that is sufficient for recording in the recording/reproduction wavelength range, the organic material layer being situated on the substrate; and a reflection layer being situated on the organic material layer; wherein the recording medium is configured to have a Low-to-High recording property and record with a laser having a wavelength that is no greater than 500 nm.

Furthermore, the present invention provides a write-only-read-many type optical recording medium including: a substrate; a reflection layer being situated on the substrate; an organic material layer having a light absorption function that is sufficient for recording in the recording/reproduction wavelength range, the organic material layer being situated on the reflection layer; and a cover layer being situated on the organic material layer; wherein the recording medium is configured to have a Low-to-High recording property and record with a laser having a wavelength that is no greater than 500 nm.

In the write-only-read-many type optical recording medium according to an embodiment of the present invention, the write-only-read-many type optical recording medium may further include: a heat insulating layer situated between the organic material layer and the reflection layer.

In the write-only-read-many type optical recording medium according to an embodiment of the present invention, the heat insulating layer may includes any of $SiO_2$, $ZnS.SiO_2$, and $ZrO_2$ as a main component.

In the write-only-read-many type optical recording medium according to an embodiment of the present invention, the heat insulating layer may include ZnS, $ZrO_2$, $Y_2O_3$, and $SiO_2$.

In the write-only-read-many type optical recording medium according to an embodiment of the present invention, the heat insulating layer may include $ZrO_2$, $TiO_2$, $SiO_2$, and X, wherein X includes at least one of $Al_2O_3$, MgO, CaO, NbO, $Y_2O_3$, and CeO.

In the write-only-read-many type optical recording medium according to an embodiment of the present invention, the organic material layer may include an organic material having a main absorption band situated toward the long wavelength side with respect to the recording/reproduction wavelength range and a second absorption band situated in the vicinity of the recording/reproduction wavelength range.

In the write-only-read-many type optical recording medium according to an embodiment of the present invention, the substrate may include groove parts and land parts, wherein recording can be performed on both the groove parts and land parts.

Furthermore, the present invention provides a write-only-read-many type optical recording medium including: a substrate; an organic material layer being situated on the substrate; and a light absorption layer being situated adjacent to the organic material layer; wherein the recording medium is configured to have a Low-to-High recording property and record with a laser having a wavelength that is no greater than 500 nm.

In the write-only-read-many type optical recording medium according to an embodiment of the present invention, the write-only-read-many type optical recording medium may further include: a reflection layer, wherein the light absorption layer, the organic material layer, and the reflection layer are layered in this order.

In the write-only-read-many type optical recording medium according to an embodiment of the present invention, the write-only-read-many type optical recording medium may further include: a reflection layer; and a cover layer; wherein the reflection layer, the organic material layer, the light absorption layer, and the cover layer are layered in this order.

In the write-only-read-many type optical recording medium according to an embodiment of the present invention, the light absorption layer may have a light absorption function for providing the Low-to-High recording property by generating change of complex refractive index, change of volume, or space parts in the organic material layer.

In the write-only-read-many type optical recording medium according to an embodiment of the present invention, the light absorption layer may have a light absorption function for providing the Low-to-High recording property by transforming the light absorption layer.

In the write-only-read-many type optical recording medium according to an embodiment of the present invention, the organic material layer may include an organic material having a main absorption band situated toward the long wavelength side with respect to the recording/reproduction wavelength range and a second absorption band situated in the vicinity of the recording/reproduction wavelength range.

In the write-only-read-many type optical recording medium according to an embodiment of the present invention, the organic material may satisfy a relation of (light absorption function of organic material layer in recording/reproduction wavelength area)<(light absorption function of light absorption layer in recording/reproduction wavelength area).

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

In a conventional write-only-read-many optical disk, it is desired to increase reflectivity of the write-only-read-many optical disk for attaining compatibility with ROM.

However, among currently developed optical recording media for blue laser wavelength, a rewritable type optical recording medium using phase change is developed earlier than the ROM type optical recording medium. Thus, the rewritable type optical recording medium is the standard recording medium for recording in the blue wavelength area.

The rewritable type optical disk typically has a low reflectivity that is no greater than 10%. Therefore, there is little need for increasing reflectivity for a short wavelength area that is no greater than the blue laser wavelength. Furthermore, even if the ROM type is developed, the ROM type may not be able to provide a high reflectivity since the reflectivity of the reflection layer itself is low in the short wavelength area that is no greater than the blue laser wavelength.

Therefore, the present invention proposes to provide a Low-to-High recording property (signal polarity) to a write-once-read-many optical disk in the recording/reproduction wavelength range that is no greater than the blue laser wavelength (no greater than 500 nm).

It is to be noted that, although the above-described Patent Document 21 provides a write-once-read-many optical disk which reverses the relation between the conventional pigment (organic compound) and the recording/reproduction wavelength. However, the technology disclosed in Patent Document 21, requires to match the recording/reproduction wavelength to the bottom of the short wavelength side of the main absorption band of the pigment. Therefore, this technology has yet to overcome the difficult problem of matching (adjusting) the recording/reproduction wavelength with respect to the pigment (See FIG. 2). Furthermore, there is no description regarding recording property (Low-to-High recording property) in Patent Document 21. Therefore, the technology disclosed in Patent Document 21 is different from that of the present invention.

With optical recording medium of the first embodiment of the present invention, the recording/reproduction wavelength is not set to match with the main absorption band of the pigment (organic material). With optical recording medium of the first embodiment of the present invention, the recording/reproduction wavelength range is set in the vicinity of an absorption band that is not assigned to the main absorption band (hereinafter referred to "second absorption band"). The second absorption band is situated more toward the short wavelength side than the main absorption band (See FIG. 3. The recording/reproduction wavelength range in this embodiment of the present invention is set in the area illustrated with diagonal lines of FIG. 3).

Figure 3:
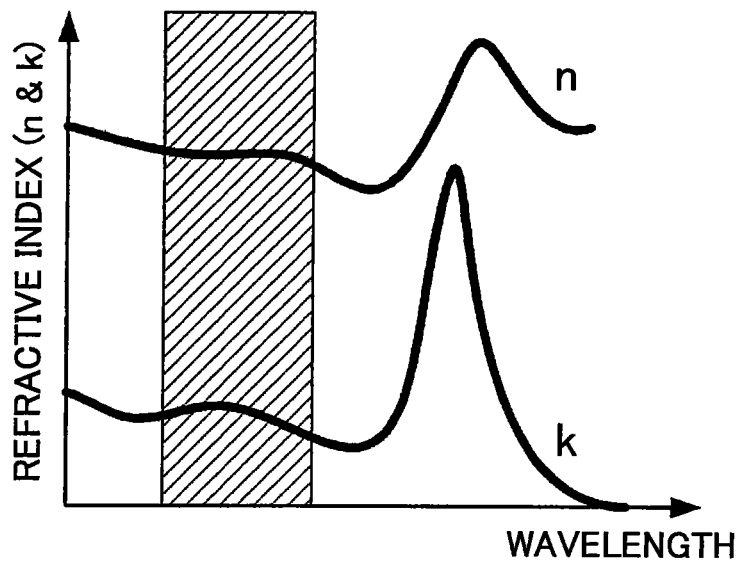
FIG. 3 is a diagram for describing the organic material (organic material layer) according to an embodiment of the present invention having a second absorption band situated in the vicinity of the recording/reproduction wavelength range (area illustrated with diagonal lines) and toward the short wavelength side with respect to the main absorption band, instead of having the main absorption band situated (matched) to the recording/reproduction wavelength range.

In other words, the organic material employed in this embodiment of the present invention has a second absorption band which is not assigned to a main absorption band (an organic material having a second absorption band having a smaller absorption function (i.e. absorption coefficient) than the main absorption band and having a broad spectrum) and has a main absorption band that is situated more toward the long wavelength side than the second absorption band (See FIG. 3).

Figure 4:
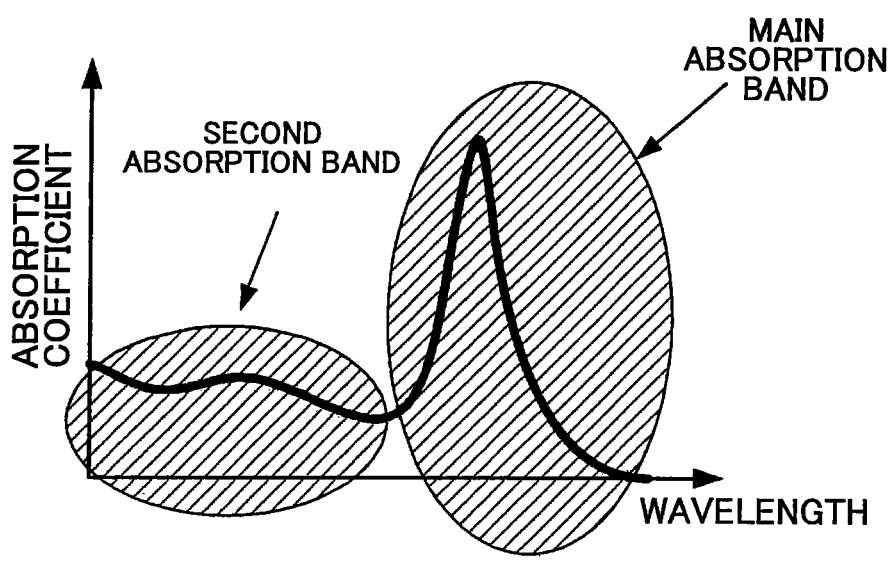
FIG. 4 is a diagram for describing a main absorption band and a second absorption band according to an embodiment of the present invention.

It is to be noted that "main absorption band" according to the present invention refers to an absorption band having the largest absorption (absorption coefficient) in the visible range, as shown in FIG. 4. The main absorption band usually indicates an absorption band based on HOMO-LUMO transition.

Figure 5:
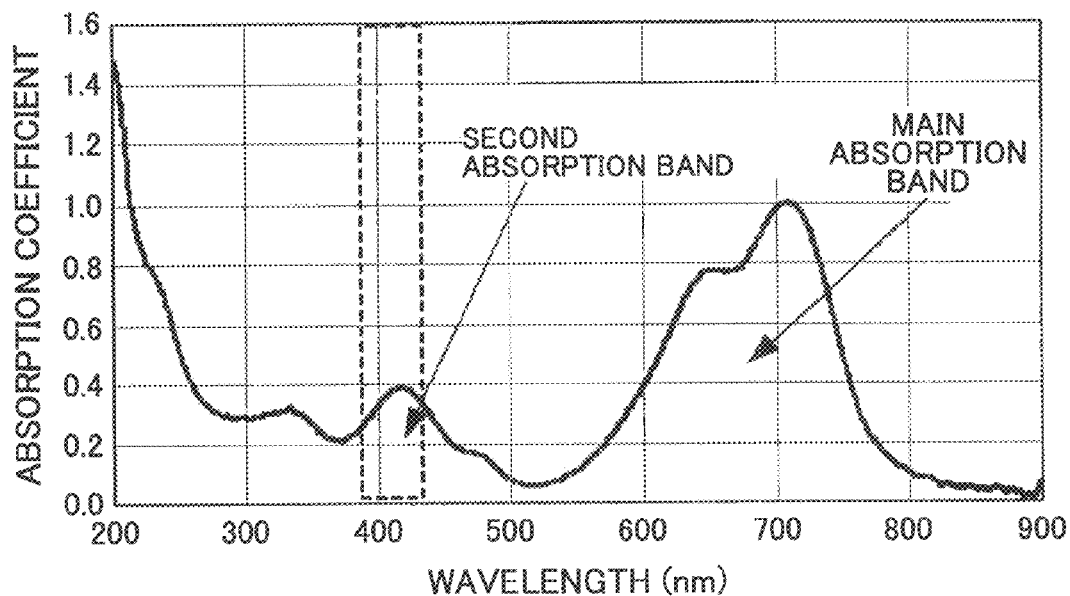
FIG. 5 is a diagram showing an absorption spectrum of a pigment (organic material) used in a first embodiment of the present invention.

For example, as shown in FIG. 5, although the pigment (organic material) having an absorption spectrum shown in FIG. 5 has an absorption band which is largest in the wavelength area that is no greater than 300 nm, this absorption band is not referred to as the main absorption band according to the present invention. In the present invention, the absorption band situated in the vicinity of 700 nm (largest absorption band in the visible range) is referred to as the main absorption band.

Furthermore, "the absorption band that is not assigned to the main absorption band and is situated more toward the short wavelength side than the main absorption band (second absorption band)" according to the present invention refers to an absorption band based on a transition that is different from that of the main absorption band (i.e. an absorption band that is not based on HOMO-LUMO transition), as shown in FIG. 4.

In the present invention, the advantages of providing a Low-to-High recording property are given below.

a) Since the write-once-read-many optical disk according to the present invention requires no precise control (matching) of the position between the main absorption band of the organic material and the recording/reproduction wavelength range, typical pigments applied to, for example, CD-R or DVD-R or compounds that are easy to composite can be used.

b) Since the write-once-read-many optical disk has a layer structure which is the same as that of a conventional write-once-read-many optical disk or a layer structure which simply has a heat insulating layer added to the conventional write-once-read-many optical disk, the optical recording medium according to the present invention can be fabricated with a simple configuration.

c) Since the recording/reproduction wavelength range of the write-once-read-many optical disk according to the present invention is not set in the vicinity of the main absorption band of the organic material, the wavelength of the laser used for recording/reproduction can be easily shortened (i.e. the degree of freedom of the recording/reproduction wavelength is large).

d) In relation to the change of recording/reproduction wavelength, the change of reflectivity and/or change of recording characteristics such as recording sensitivity, modulation degree, jitter, error rate can be reduced (This owes to the fact that the absorption function of the main absorption band having large absorption coefficient is not used and that there is little change of complex refractive index of the organic material in the vicinity of the recording/reproduction wavelength).

For the purpose of providing the Low-to-High recording property, an optical recording medium 20 according to the first embodiment of the present invention includes a substrate 11 on which an organic material layer 12 having a sufficient light absorption function for recording in the recording/reproduction wavelength range and a reflection layer 13 that are layered in this order. Furthermore, another optical recording medium 200 according to the first embodiment of the present invention includes a substrate 110 on which a reflection layer 130, an organic material layer 120 having a sufficient light absorption function for recording in a recording/reproduction wavelength range, and a cover layer 140 that are layered in this order.

With the foregoing configurations of the optical recording media 20, 200 according to the first embodiment of the present invention, the organic material layers 12, 120 serve to provide the main light absorption function since the layers other than the organic material layers 12, 120 do not have enough absorption function for recording.

As long as a sufficient light absorption function can be provided, there is no particular restriction regarding the organic material that can be used in the present invention. It is, however, preferable to employ an organic material having a second absorption band (i.e. absorption band that is not assigned to the main absorption band) situated in the vicinity of the recording/reproduction wavelength range in order to easily realizing the Low-to-High recording property.

It is to be noted that, the second absorption band (i.e. absorption band that is not assigned to the main absorption band situated toward the long wavelength side with respect to the recording/reproduction wavelength range) is desired to have a sufficient light absorption function (i.e. absorption coefficient) for recording in the recording/reproduction wavelength range.

For example, in the pigment (organic material) having the absorption spectrum shown in FIG. 5, the second absorption band (i.e. absorption band which is not assigned to the main absorption band) has a sufficient light absorption function (i.e. absorption coefficient) for recording in the recording/reproduction wavelength range. Meanwhile, in the pigment (organic material) having the absorption spectrum shown in FIG. 8, the second absorption band is deviated from the recording/reproduction wavelength range and has a low light absorption function for recording (The area illustrated with a broken line in FIGS. 5 and 8 indicates the recording/reproduction wavelength range. The range has the blue laser wavelength of 405 nm as its center and covers the fluctuation range of the wavelength).

Therefore, the organic material having the absorption spectrum shown in FIG. 5 is preferably used as the organic material layer in a case of using an optical recording medium including a substrate on which an organic material layer having a sufficient light absorption function for recording in the recording/reproduction wavelength range and a reflection layer that are layered in this order, or in a case of using another optical recording medium including a substrate on which a reflection layer, an organic material layer having a sufficient light absorption function for recording in the recording/reproduction wavelength range, and a cover layer that are layered in this order.

Since the organic material layer 12, 120 is formed by the above-described organic material having a main absorption band situated toward the long wavelength side with respect to the recording/reproduction wavelength range and having a second absorption band (i.e. absorption band that is not assigned to the main absorption band) situated in the vicinity of the recording/reproduction wavelength range, a Low-to-High recording property can easily be attained for the optical recording medium 20, 200. Furthermore, since the organic material layer 12, 120 serves to provide the main light absorption function, the configuration of the optical recording medium 20, 200 can be simplified.

With the light absorption function of the organic material layer 12, 120 according to the first embodiment of the present invention, recorded parts are formed in accordance with the below-given processes a)-d).

a) Transforming the substrate.
b) Changing the complex refractive index of the organic material layer.
c) Changing the volume of the organic material layer.
d) Forming space parts (cavity parts) in the organic material layer.

The present invention according to a second embodiment of the present invention does not use the above-described organic material having a main absorption band situated toward the long wavelength side with respect to the recording/reproduction wavelength range and a second absorption band situated in the vicinity of the recording/reproduction wavelength range.

In order to attain the Low-to-High recording property, the optical recording medium according to the second embodiment of the present invention is configured having a substrate on which a light absorption layer and an organic material layer are provided adjacently. In the optical recording medium according to the second embodiment of the present invention, the light absorption layer serves to provide the main light absorption function instead of the organic material layer described in the first embodiment of the present invention. Therefore, the degree of freedom in selecting the organic material for the organic material layer can be increased.

Therefore, not only the "organic material having a main absorption band situated toward the long wavelength side with respect to the recording/reproduction wavelength and a second absorption band situated in the vicinity of the recording/reproduction wavelength" may be used for the organic material layer, but also other organic materials may be used for the organic material layer. That is, there is no particular condition regarding, for example, the relation between the position of the recording/reproduction wavelength range and the position of the absorption bands of the organic material layer, or the absorption function of the organic material layer in the recording/reproduction wavelength area.

Figure 8:
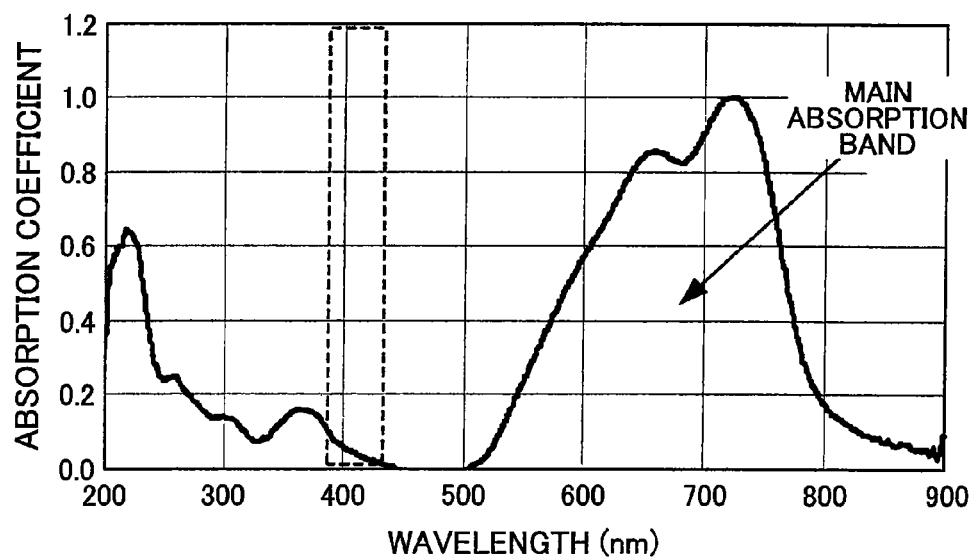
FIG. 8 is a diagram showing an absorption spectrum of a pigment (organic material) used in a third embodiment of the present invention.

For example, the organic material having the absorption spectrum shown in FIG. 8 (which hardly has any absorption function (absorption coefficient) in the recording/reproduction wavelength range) can be used for the organic material layer according to the second embodiment of the present invention.

However, in order to increase reflectivity in an unrecorded state and enhance recording/reproduction characteristics, it is desired that the organic material layer satisfies the below-given relation.

(light absorption function of organic material layer in recording/reproduction wavelength area)<(light absorption function of light absorption layer in recording/reproduction wavelength area)

Accordingly, by adding the light absorption layer, conventional organic materials may be used for the organic material layer of the write-only-read-many optical recording medium. Thereby, recording can be performed on the write-only-read-many optical recording medium by using, for example, transformation of the light absorption layer.

One example of the optical recording medium according to the second embodiment is an optical recording medium 300 including a substrate 210 on which a light absorption layer 220, an organic material layer 230, and a reflection layer 240 that are layered in this order. Another example of the optical recording medium according to the second embodiment is an optical recording medium 400 including a substrate 310 on which a reflection layer 320, an organic material layer 330, light absorption layer 340, and a cover layer 350 that are layered in this order.

With the light absorption function of the light absorption layer 220, 340 according to the second embodiment of the present invention, recorded parts are formed in accordance with the below-given processes a)-e).

a) Transforming the light absorption layer.
b) Transforming the substrate.
c) Changing the complex refractive index of the organic material layer.
d) Changing the volume of the organic material layer.
e) Forming space parts (space parts) in the organic material layer.

However, even if the above-described conditions are satisfied, the film thicknesses of each layer or the complex refractive index are to be suitably optimized for attaining the Low-to-High recording property.

Figure 1:
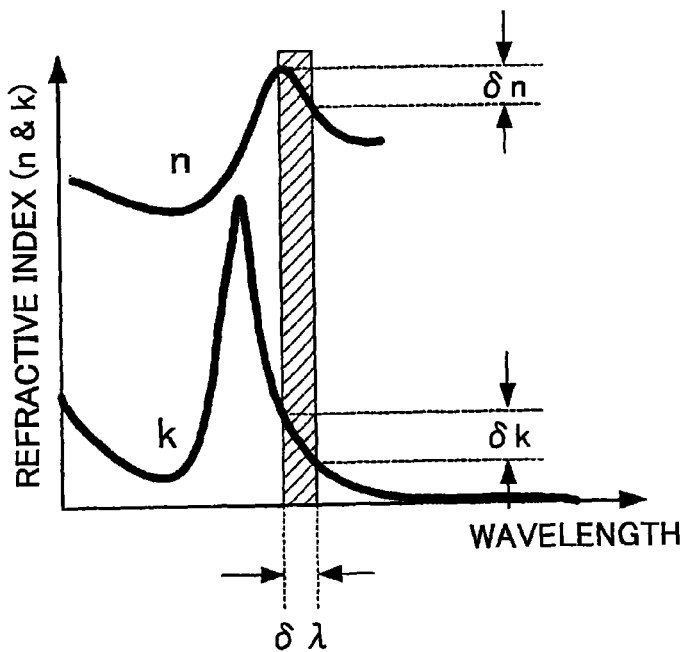
FIG. 1 is a diagram showing a considerable amount of change of complex refractive index δn or δk with respect to a slight amount of change of wavelength δ λ, in a case of a write-once-read-many optical recording medium using a conventional organic material.
Figure 2:
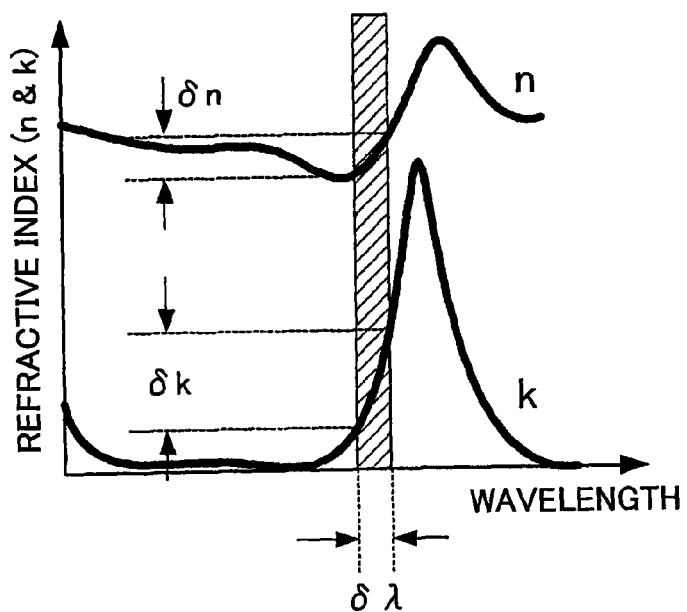
FIG. 2 is a diagram for showing that matching of difficulty in matching a pigment with respect to a recording/reproduction wavelength by using the technology shown in Japanese Laid-Open Patent Application No. 2002-74740.

In the optical recording medium according to the second embodiment of the present invention, a) either an organic material having a main absorption band situated toward the long wavelength side with respect to the recording/reproduction wavelength range or an organic material having a main absorption band situated toward the long wavelength side with respect to the recording/reproduction wavelength range and a second absorption band situated in the recording/reproduction wavelength range is selected, b) the light absorption layer is situated adjacent to the organic material layer. Therefore, there is no need to maintain a predetermined relation between the absorption spectrum of the organic material and the recording/reproduction wavelength. Furthermore, recording characteristics (e.g. recording sensitivity, modulation degree, jitter, error rate) and/or reflectivity can be prevented from changing considerably with respect to the change of recording/reproduction wavelength (See FIGS. 1, 2 and 3. The relation between the absorption spectrum of the conventional optical recording medium and the recording/reproduction wavelength is shown in FIGS. 1 and 2. FIG. 3 shows the change of complex refractive index in a case using the optical recording medium of the present invention, in which the change of complex refractive index in the vicinity of the recording/reproduction wavelength (area illustrated with diagonal lines) is considerably moderate.)

Figure 10:
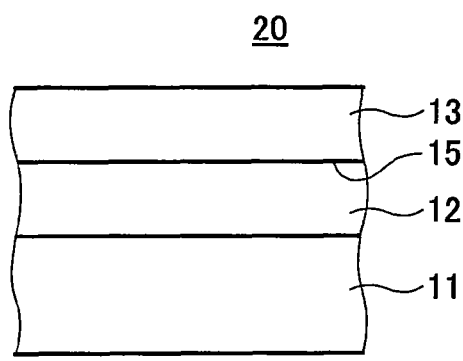
FIG. 10 is a schematic drawing of one example of an optical recording medium of the present invention.
Figure 11:
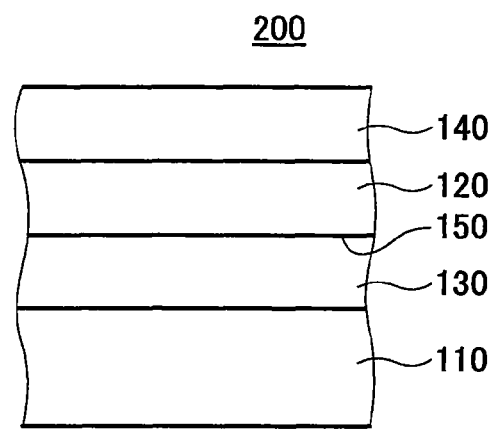
FIG. 11 is a schematic drawing of another example of an optical recording medium of the present invention.
Figure 12:
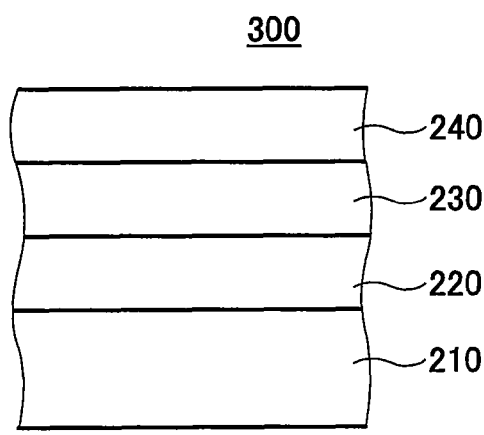
FIG. 12 is a schematic drawing of yet another example of an optical recording medium of the present invention.
Figure 13:
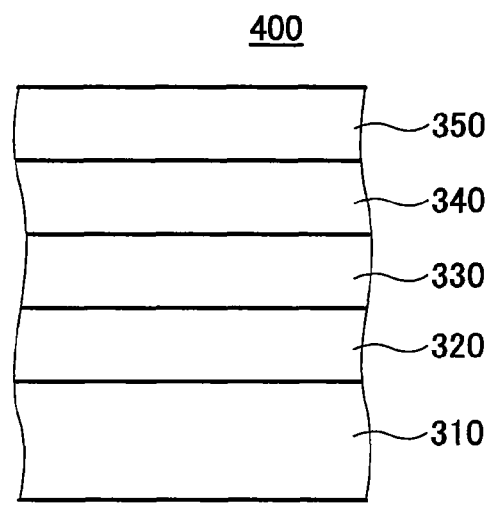
FIG. 13 is a schematic drawing of further yet another example of an optical recording medium of the present invention.

Meanwhile, the optical recording medium according to the first embodiment of the present invention may further be provided with a heat insulating layer 15, 150 disposed between the organic material layer 12, 120 and the reflection layer 13, 130 (See FIGS. 10 and 11). By providing the heat insulating layer 15, 150 between the organic material layer 12, 120 and the reflection layer 13, 130, the change of complex refractive index of the organic material layer 12, 120 and/or the change of volume of the organic material layer 12, 120 can be created more efficiently and recording sensitivity can be improved. The heat insulating layer 15, 150 not only provides a heat insulating effect, but may also be used for controlling reflectivity in an unrecorded state or for controlling modulation degree.

In the write-only-read-many optical recording medium according to a second embodiment of the present invention having an organic material layer with a conventional organic material, the organic material layer is commonly formed by a spin-coating method. Therefore, in the organic material layer, the thickness of the organic material layer tends to be greater at the groove parts compared to that at the land parts. Furthermore, only the organic material of the organic material layer serves to provide a light absorption function. Furthermore, the organic material of the organic material layer mainly creates modulation degree by causing, for example, change of optical constant.

Accordingly, even if satisfactory recording can be performed on the groove parts in the organic material layer, the land parts having lesser thickness than the groove parts leads to reduction of light absorption function and reduction in the amount of phase difference change caused by recording. This commonly results in a poor recording performance (Particularly, in the land parts of an optical recording medium having a substrate on which an organic material layer and a reflection layer are layered in this order, the high thermal conductivity of the reflection layer makes it difficult for the recording material layer to reach a temperature required for forming recording parts).

It is, however, possible to provide the land parts with a recording/reproduction characteristic that is the same as that of the groove parts by performing an evaporation method on the organic material layer or by performing a spin-coating method with optimized coating conditions on the organic material layer.

Meanwhile, by providing the heat insulating layer between the organic material layer and the reflection layer of the optical recording medium according to the first embodiment of the present invention, the heat insulating layer prevents heat from spreading from the reflection layer. Accordingly, the organic material layer can be heated to the temperature for forming recording parts even in a case where a sufficient light absorption function cannot be attained due to the thin land parts in the organic material layer. Thereby, recording parts can be formed in both the land parts and the groove parts of the organic material layer.

It is to be noted that, the recording characteristics (e.g. recording sensitivity, modulation degree) may be different in the groove parts and the land parts (i.e. the recording characteristics in the groove parts and the land parts are not required to be the same).

Furthermore, in the optical recording medium according to the second embodiment of the present invention, the light absorption layer is provided adjacent to the organic material layer so that the light absorption layer serves to provide the light absorption function instead of the organic material layer.

The light absorption layer may be formed of a material such as ceramic, metal or a semi-metal. Since the light absorption layer is normally deposited by using a sputtering method or an evaporation method, there is no difference of light absorption function at the groove parts and the land parts.

Therefore, although there may be a difference of modulation degree due to the difference of thickness at the groove parts and the land parts of the organic material layer, the configuration of having the organic material layer deposited (e.g. spin-coated) on the light absorption layer enables recording parts to be easily formed in both the groove parts and the land parts of the organic material layer. Accordingly, high density recording can easily be achieved.

As describe above, it is also possible to form the recording parts in either the groove parts or the land parts of the organic material layer.

Although the optical recording medium according to the foregoing embodiments of the present invention is formed with a layered configuration including a substrate, an organic material layer, a heat insulating layer, a reflection layer, and a cover layer or a layered configuration including a substrate, a reflection layer, an organic layer, a light absorption layer, and a cover layer, other layers such as an undercoat layer, an overcoat layer, or a protective layer may also be provided according to necessity.

Various materials may be employed as the substrate as long as the material is a transparent material that allows recording light and reproduction light to be transmitted therethrough. The material includes, for example, resin material (e.g. acrylate resin, methacrylic resin, polycarbonate resin, polyolefine resin (particularly, amorphous polyolefine), polyester resin, polystyrene resin, epoxy resin), glass material, or a glass material having radiation cured resin (e.g. photo-curing resin) applied thereon. It is preferable to employ an injection molded polycarbonate as the substrate from the aspects of, for example, productivity, manufacturing cost, and moisture absorption resistance. It is preferable to employ an amorphous polyolefine from the aspects of, for example, chemical resistance and moisture absorption resistance. Furthermore, it is preferable to employ a glass material from the aspects of, for example, high speed response and prevention of pores (gaps).

Furthermore, a resin substrate or a resin layer may be provided in a manner contacting the organic material layer or the optical absorption layer, and guiding grooves and pits for the recording/reproduction light beam may be formed in the resin substrate or the resin layer.

As for the organic material employed for the organic material layer, it is preferable to use a pigment. The pigment includes, for example, metal-containing azo pigments, phthalocyanine pigments, naphthalocyanine pigments, cyanine pigments, azo pigments, squarium pigments, metal-containing indoaniline pigments, triarylmethane pigments, merocyanine pigments, azulenium pigments, naphthquinone pigments, anthraquinone pigments, indophenol pigments, xanthene pigments, oxadine pigments, and pyrilium pigments.

Furthermore, the organic material layer may also contain, for example, a transition-metal compound (e.g. acetylacetonchelate, bisphenyldithior, salicylaldehydeoxime, bisdithio-α-diketone) as a singlet oxygen quencher for stabilizing the organic material or for improving light resistance. The organic material layer may also contain, for example, recording sensitivity enhancement agents such as metal compounds for enhancing recording sensitivity.

Here, metal compounds refer to metals (e.g. transition-metal) contained in a compound in the form of, for example, atoms, ions, or clusters (e.g. organic metal compounds such as ethylenediamine complex, azomethine complex, phenylhydroxyamine complex, phenanthroline complex, dihydroxyazobenzene complex, dioxime complex, nitrosaminophenol complex, pyridyltriazine complex, acetylacetonate complex, methalocene complex, and porphyrin complex). Although there are no particular limitations regarding metal atoms, it is preferable to employ transition-metal. Furthermore, the above-described organic materials may be used together with other pigments according to necessity.

Furthermore, the above-described organic materials may be used together with binders, leveling agents, and anti-foaming agents according to necessity. As a preferable binder, there is, for example, polyvinyl alcohol, a polyvinyl pyrrolidone, nitrocellulose, cellulose acetate, ketone resin, acrylic resin, polystyrene resin, urethane resin, polyvinyl butyral, polycarbonate, and polyolefine.

Since the suitable thickness of the organic material layer differs depending on the recording method, there is no particular limit regarding the thickness of the organic material layer. The thickness of the organic material layer normally ranges from 50 nm to 300 nm.

As for the method of depositing the organic material layer, there are, for example, common thin film fabrication methods, such as, a vacuum-evaporation method, a sputtering method, a doctor-blade method, a casting method, a spin-coating method, and a steeping method. It is preferable to employ the spin-coating method from the aspect of mass-production and manufacturing cost. Furthermore, it is preferable to employ a vacuum-evaporation method from the aspect of forming the recording layer with an even (uniform) thickness.

In a case of using the spin-coating method, a rotation speed ranging from 500 rpm to 15000 rpm is preferable. Furthermore, the substrate, in some cases, may be applied with, for example, heat or solvent vapor after the spin-coating process. There is no particular restriction regarding the solvent used in forming the recording layer with the above-described coating methods (e.g. doctor-blade method, casting method, spin-coating method, steeping method) as long as the solvent does not damage the substrate.

The solvent includes, for example, ketone alcohol solvents (e.g. diacetone alcohol, 3-hydroxy-3-methyl-2-butanone), cellosolve solvents (e.g. methyl cellosolve, ethyl cellosolve), chain hydrocarbon solvents (e.g. n-hexane, n-octane), cyclic hydrocarbon solvents (e.g. cyclohexane, methylcyclohexane, ethylcyclohexane, dimethylcyclohexane, n-butylcylcohexane, tert-butylcyclohexane, cyclooctane), perfluoroalkyl alcohol solvents (e.g. tetrafluoropropanol, octafluoropentanol, hexafluorobutanol), and hydroxy carboxylate solvents (e.g. methyl lactate, ethyl lactate, methyl isobutyrate).

As for other materials that may be used for the organic material layer, there is, for example, polymer materials, phase change materials, photochromic materials, and thermochromic materials.

From the aspect of obtaining sufficient recording sensitivity, it is preferable for the material used for the light absorption layer to have a relatively high absorption coefficient with respect to the recording/reproduction wavelength. The material used for the light absorption layer includes, for example, carbide non-oxides (e.g. SiC, $B_4C$, TiC, WC), carbon non-oxides (e.g. amorphous carbon, graphite, diamond), ceramics (e.g. ferrite), phase change recording materials (e.g. Te—TeO$_2$, Te—TeO$_2$—Pd, Sb$_2$Se$_3$/Bi$_2$Te$_3$, Ge—Te—Sb—S, Te—TeO$_2$—Ge—Sn, Te—Ge—Sn—Au, Ge—Te—Sn, Sn—Se—Te, Sb—Se—Te, Sb—Se, Ga—Se—Te, Ga—Se—Te—Ge, In—Se, In—Se—Tl—Co, Ge—Sb—Te, In—Se—Te, Ag—In—Sb—Te, Ag—Zn, Cu—Al—Ni, In—Sb, In—Sb—Se, In—Sb—Te), pure metal materials (e.g. nickel, chromium, titanium, tantalum), alloy materials (e.g. copper/aluminum alloy, nickel/iron alloy), semi-metal materials (e.g. silicon), and semiconductor materials (e.g. Ge).

Among the above-described materials, it is preferable to use a material containing Si, Ge as the light absorption layer (e.g. Si, Ge, SiC). The thickness of the light absorption layer normally ranges from 5 nm to 150 nm.

As for the material used for the heat insulating layer, there is, for example, simple oxides (e.g. $Al_2O_3$, MgO, BeO, $ZrO_2$, $UO_2$, $ThO_2$), silicate oxides (e.g. $SiO_2$, $2MgO.SiO_2$, $MgO.SiO_2$, $CaO.SiO_3$, $ZrO_2.SiO_2$, $3Al_2O_3.2SiO_2$, $2MgO.2Al_2O_3.5SiO_2$, $Li_2O.Al_2O_3.4SiO_2$), double oxides (e.g. $Al_2TiO_5$, $MgAl_2O_4$, $Ca_{10}(PO_4)_6(OH)_2$, $BaTiO_3$, $LiNbO_3$, PZT=Pb(Zr, Ti)$O_3$, PLZT=(Pb, La)(Zr, Ti)$O_3$, ferrite), nitride non-oxides (e.g. $Si_3N_4$, $Si_{6-z}AL_zO_zN_{8-z}$, AlN, BN, TiN), carbide non-oxides (e.g. SiC, $B_4C$, TiC, WC), boride non-oxides (e.g. $LaB_6$, $TiB_2$, $ZrB_2$), sulfide non-oxides (e.g. CdS, $MoS_2$), silicide non-oxides (e.g. $MoSi_2$), and carbon non-oxides (e.g. amorphous carbon, graphite, diamond).

It is preferable to use $SiO_2$ or $ZnS.SiO_2$ as a main body (main component) of the heat insulating layer from the aspect of productivity and transparency with respect to the recording/reproduction light. Furthermore, it is preferable to use $ZrO_2$ as a main body (main component) of the heat insulating layer from the aspect of obtaining a sufficient heat insulting effect. Here, "main component" refers to consisting no less than 50%, by weight, of the entire heat insulating material.

Furthermore, it is preferable that the material of the heat insulating layer is an oxide having ZnS, $ZrO_2$, $Y_2O_3$, and $SiO_2$. Alternatively, it is preferable that the material of the heat insulating layer is a material having $ZrO_2$, $TiO_2$, $SiO_2$, and a material X, in which the material X includes at least one of $Al_2O_3$, MgO, CaO, NbO, $Y_2O_3$, or CeO. The thickness of the heat insulating layer normally ranges from approximately 5 nm to 200 nm.

The reflection layer may be disposed on the organic material layer directly or via the heat insulating layer or the overcoat layer, for example. The thickness of the reflection layer preferably ranges from 50 nm to 300 nm.

A material having sufficient reflectivity with respect to the wavelength of the reproduction light beam may be used for the reflection layer. The material of the reflection layer includes, for example, single or alloys of Au, Al, Ag, cu, Ti, Cr, Ni, Pt, Ta, and Pd. Among such metals, Au, Al and Ag are high reflectivity materials that are suitable for the reflection layer.

Furthermore, the reflection layer having the above-described metals as the main component may also include other elements. The elements may be metals or semi-metals such as Mg, Se, Hf, V, Nb, Ru, W, Mn, Re, Fe, Co, Rh, Ir, Cu, Zn, Cd, Ga, In, Si, Ge, Te, Pb, Po, Sn, and Bi. It is preferable to use Al as the main component since a high reflectivity can be obtained at a low cost. Materials other than metals may also be used for the reflection layer. In this case, the reflection layer is formed as a multi-layer structure, in which a thin layer having low refractive index and another thin layer having high refractive index are alternately stacked on each other.

The reflection layer may be formed by employing, for example, a sputtering method, an ion-plating method, a chemical evaporation method, or a vacuum evaporation method.

An overcoat layer, an undercoat layer, or a bonding layer of a known inorganic or organic material may be disposed on the substrate or the reflective layer for the purpose of enhancing reflectivity, improving recording characteristics, or improving adhesiveness.

There is no particular restriction regarding the material used as the protective layer provided on the reflection layer as long as it serves to protect the reflection layer from external force. As an organic material used for the protective layer, there is, for example, a thermoplastic resin, a thermosetting resin, an electron radiation curing resin, and a UV curing resin. As an inorganic material used for the protective layer, there is, for example, $SiO_2$, $SiN_4$, $MgF_2$, and $SnO_2$.

The thermoplastic resin and the thermosetting resin can be formed on the reflection layer by applying a coating liquid (obtained by dissolving the resin in a suitable solvent) onto the reflection layer and drying the coating liquid.

The UV curing resin may be applied in the form as is or applied in the form of a coating liquid (obtained by dissolving the resin in a suitable solvent) onto the reflection layer and curing the resin by irradiating a UV light thereto. The UV curing resin includes, for example, acrylate resins such as urethane acrylate, epoxy acrylate, and polyester acrylate. These materials may be used alone or in combination and may be applied as a single layer or as multiple layers.

The protective layer may be formed by employing, for example, various coating methods (e.g. spin-coating method, casting method), a sputtering method, or a chemical evaporation method. Among these methods, it is preferable to use the spin-coating method.

The thickness of the protective layer normally ranges from 0.1 μm to 100 μm. In the present invention, the thickness of the protective layer preferably ranges from 3 μm to 30 μm.

Alternatively, the substrate may be adhered to the reflection layer. Furthermore, one optical recording medium may be adhered to another optical recording medium reflection in a manner having each of the reflection layers facing each other in an inward direction.

Furthermore, a UV curing resin layer or an inorganic thin film layer may be deposited on the mirror surface side of the substrate for the purpose of protecting the substrate surface or preventing particles from attaching thereto.

The cover layer is to be used in a case where a lens having a high NA (numerical aperture) is employed for high density recording. For example, in a case where a lens of a high NA is employed, it is desired to reduce the thickness of the portion throughwhich the reproduction light beam is transmitted. This is because the allowable amount of aberration (caused by so-called tilt angle (deviation of disk plane with respect to perpendicularly intersecting optical axis of the optical pickup) is reduced as the NA becomes higher and because the tilt angle is easily affected by aberration that varies depending on the thickness of the substrate.

Accordingly, by reducing the thickness of the substrate, the effects of the aberration with respect to the tilt angle can be reduced.

Therefore, the optical recording medium according to one embodiment of the present invention is provided with a substrate, a recording layer (organic material layer) being formed on the substrate with lands and grooves, a reflection layer being formed on the recording layer, and a thin film cover layer being formed on the reflection layer for allowing light to be transmitted therethrough. With the optical recording medium according to this embodiment of the present invention, the information recorded on the recording layer is reproduced by irradiating a reproduction light beam from the side toward the cover layer. The optical recording medium according to another embodiment of the present invention is provided with a substrate, a reflection layer being provided on the substrate, a recording layer (organic material layer) being formed on the reflection layer, and a cover layer being formed on the recording layer for allowing light to be transmitted therethrough. The optical recording medium according to the other embodiment of the present invention also enables information recorded on the recording layer to be reproduced by irradiating a reproduction light beam from the side toward the cover layer.

Accordingly, the increase in the NA of the objective lens can be accommodated by forming the cover layer as a thin film layer. That is, recording can be performed in higher density by providing the thin film cover layer and reproducing information by irradiating the reproduction light beam from the cover layer side.

It is to be noted that, the cover layer is typically formed with a polycarbonate sheet or a UV curing resin. Furthermore, the cover layer may be provided with an adhesive layer for attachment with another layer.

The thickness of the cover layer typically ranges approximately from 0.01 mm to 0.5 mm.

The laser beam irradiated to the optical recording medium according to the above-described embodiments of the present invention is preferred to have a short wavelength for performing high density recording (for example, a laser beam with a wavelength ranging from 350 nm to 530 nm). One representative example of such laser beam is a laser beam having a center wavelength of 405 nm.

Next, more specific examples of the present invention are described. The present invention, however, is not to be limited to these examples.

EXAMPLE 1

In this example, a write-only-read-many optical recording medium including a substrate (having track guide grooves with a groove depth of 55 nm) on which an organic material layer (formed with a organic pigment material and having an average thickness of approximately 60 nm), a Ag reflection layer (having a thickness of 150 nm), and a protective layer (formed with a UV curing resin and having a thickness of 5 μm) are layered in this order. The organic pigment material, having a structure shown below in [Formula 1], has an absorption spectrum that is suitable for CD-R, as shown in FIG. 5.

This organic pigment material corresponds to the above-described organic material having a sufficient light absorption function accommodating the recording/reproduction wavelength and further corresponds to the above-described organic material having a main absorption band situated toward the long wavelength side with respect to the recording/reproduction wavelength range and a second absorption band situated in the vicinity of the recording/reproduction wavelength range.

[Formula 1]

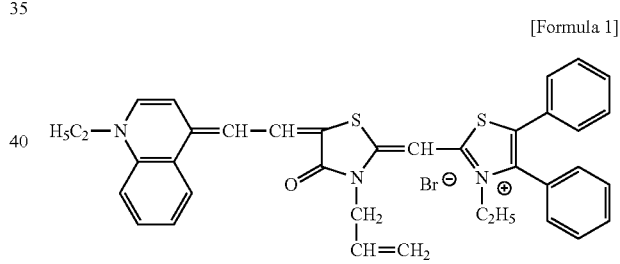

Under the below-given conditions, recording was performed on the groove parts of the optical recording medium by using an optical disk evaluation device DDU-1000 (manufactured by Pulstec Industrial Co., Ltd, wavelength: 405 nm, NA: 0.65). As a result, a Low-to-High recording property was obtained.

<Recording Conditions>

| | |
|---|---|
| Linear Recording Density | 1T = 0.0917 |
| Type of Modulation | 8-16 modulation |
| Linear Recording Speed | 6.0 (m/s) |
| Recording Strategy | Basic Strategy |
| | Ttop-Tmp = 1.20-0.60 (T) |

According to the optical recording medium of the first example of the present invention, the optimum jitter was obtained in the vicinity of a recording power of 7.5 mW, in which the jitter (σ/Tw) was 9.5%.

Figure 6:
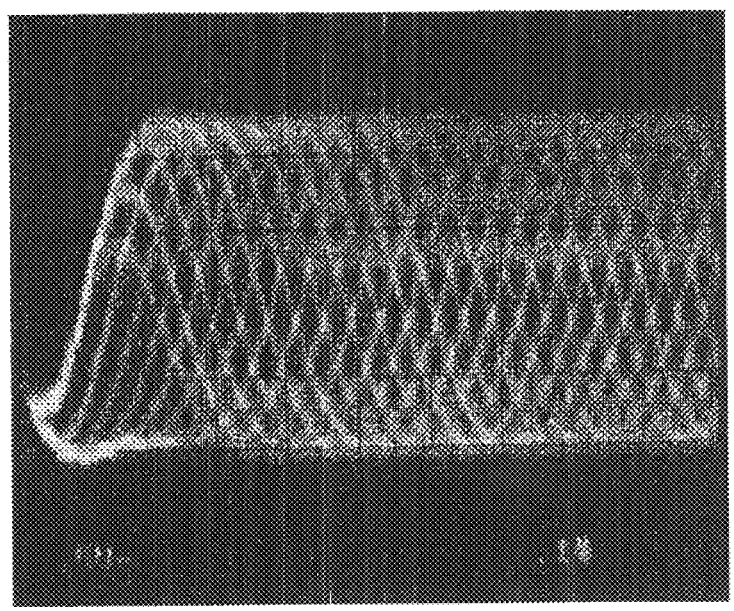
FIG. 6 is a diagram showing an eye pattern of a reproduction signal(s) of a write-only-read-many optical recording medium according to a first embodiment of the present invention.

FIG. 6 shows an eye pattern of reproduction signals obtained after performing an equalizing process. The results show that satisfactory recording performance can be obtained by the optical recording medium according to the first example of the present invention.

Figure 7:
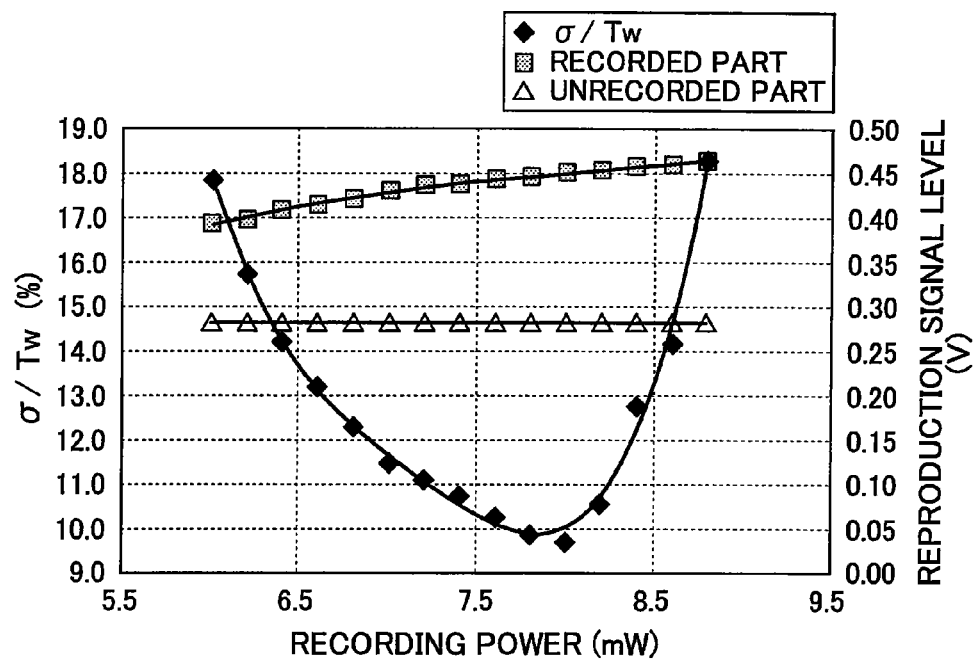
FIG. 7 is a diagram showing results in evaluating changes (e.g. jitter change) by recording in various recording powers, at recorded parts and unrecorded parts of a write-only-read-many optical recording medium according to a first embodiment of the present invention.

FIG. 7 shows results of evaluating change of jitter and change of the reproduction signal level (change of reflectivity) at recorded parts (■) and unrecorded parts (Δ) where recording is conducted in various recording powers with the optical recording medium according to the first example of the present invention. FIG. 7 shows that a significant recording contrast and a satisfactory jitter characteristic can be obtained with the optical recording medium according to the first example of the present invention.

EXAMPLE 2

The second example is described for showing that the recording power for obtaining an optimum jitter can be reduced and that satisfactory jitter characteristics can be obtained by inserting a heat insulating layer (shown below in Table 1) between the pigment layer (organic material layer) and the reflection layer to the optical recording medium according to the first example of the present invention. Other than the heat insulating layer being inserted between the pigment layer (organic material layer) and the reflection layer, the configuration of the optical recording medium according to the second example of the present invention is the same as that the optical recording medium according to the first example of the present invention.

In the same manner as Example 1, the optimum recording power and the optimum jitter was evaluated by recording at the groove parts of the optical recording medium according to the second example of the present invention. The results are shown in Table 1.

TABLE 1

| Material of Heat Insulating Layer | Optimum Recording Power (mW) | Jitter σ/Tw (%) |
|---|---|---|
| SiO$_2$ | 6.8 | 9.8 |
| ZnS—SiO$_2$ | 7.1 | 9.9 |
| (ZrO$_2$—3 mol % Y$_2$O$_3$) | 6.5 | 9.6 |
| (ZrO$_2$—3 mol % Y$_2$O$_3$)—5 mol % SiO$_2$ | 6.6 | 9.7 |
| (ZrO$_2$—3 mol % Y$_2$O$_3$)—20 mol % TiO$_2$ | 6.4 | 9.5 |
| (ZrO$_2$—3 mol % Y$_2$O$_3$)—50 mol % TiO$_2$ | 6.2 | 9.6 |
| (ZrO$_2$—8 mol % Y$_2$O$_3$)—20 mol % TiO$_2$ | 6.0 | 9.8 |
| (ZrO$_2$—3 mol % Y$_2$O$_3$)—10 mol % TiO$_2$ | 6.3 | 9.5 |

It is to be noted that, a Low-to-High recording property can be obtained with the optical recording medium according to the second example of the present invention using different materials for the heat insulating layer.

Furthermore, with the optical recording medium of the first example having no heat insulating layer provided thereto, recording could not be sufficiently performed at the land parts in a case where the recording power is no greater than 11.0 mW. In such a case, jitter characteristics could not be measured. Meanwhile, with the optical recording medium of the second example having the heat insulating layer provided thereto, recording could be sufficiently performed at the land parts, and the jitter characteristic could be measured even when the recording power is no greater than 11.0 mW.

However, since optimization of various conditions (e.g. shape of the groove parts and land parts, coating state of the pigment, thickness of the pigment layer) is not performed in the second example, the recording at the land parts showed that the optimum recording power increased to an average of approximately 2.0 mW and the optimum jitter increased to approximately 12.0% when compared to recording at the groove parts.

EXAMPLE 3

In the third example, another write-only-read-many optical recording medium including a substrate (having track guide grooves with a groove depth of 55 nm) on which a light absorption layer (formed of SiC and having a thickness of 10 nm), an organic material layer (formed with a organic pigment material and having an average thickness of approximately 60 nm), a Ag reflection layer (having a thickness of 150 nm), and a protective layer (formed with a UV curing resin and having a thickness of 5 μm) are layered in this order. The organic pigment material, having a structure shown below in [Formula 2], has an absorption spectrum that is suitable for CD-R, as shown in FIG. 8.

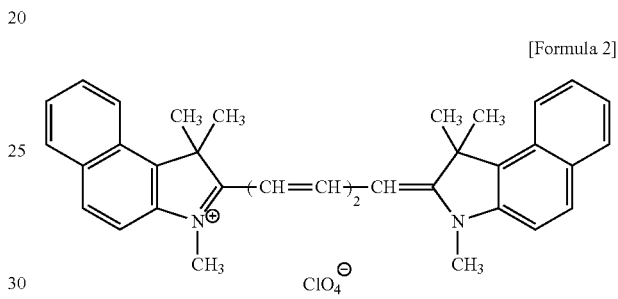

[Formula 2]

The organic pigment material in the third example hardly has any absorption in the recording/reproduction wavelength range and corresponds to a material satisfying the above-described relation of "(light absorption function of organic material layer in recording/reproduction wavelength area)< (light absorption function of light absorption layer in recording/reproduction wavelength area)".

Under the below-given conditions, recording was performed on the land parts of the optical recording medium by using an optical disk evaluation device DDU-1000 (manufactured by Pulstec Industrial Co., Ltd, wavelength: 405 nm, NA: 0.65). As a result, a Low-to-High recording property was obtained.

<Recording Conditions>

| Linear Recording Density | 1T = 0.0917 |
|---|---|
| Type of Modulation | 8-16 modulation |
| Linear Recording Speed | 6.0 (m/s) |
| Recording Strategy | Basic Strategy |
| | Ttop-Tmp = 1.20-0.60 (T) |

According to the optical recording medium of the first example of the present invention, the optimum jitter was obtained in the vicinity of a recording power of 7.5 mW, in which the jitter (σ/Tw) was 9.5%.

According to the optical recording medium of the third example of the present invention, the optimum jitter was obtained in the vicinity of a recording power of 8.5 mW, in which the jitter (σ/Tw) was 10.0%.

The eye pattern of reproduction signals obtained after performing an equalizing process is substantially the same as the eye pattern shown in FIG. 6 and shows that satisfactory recording performance can be obtained by the optical recording medium according to the third example of the present invention.

Figure 9:
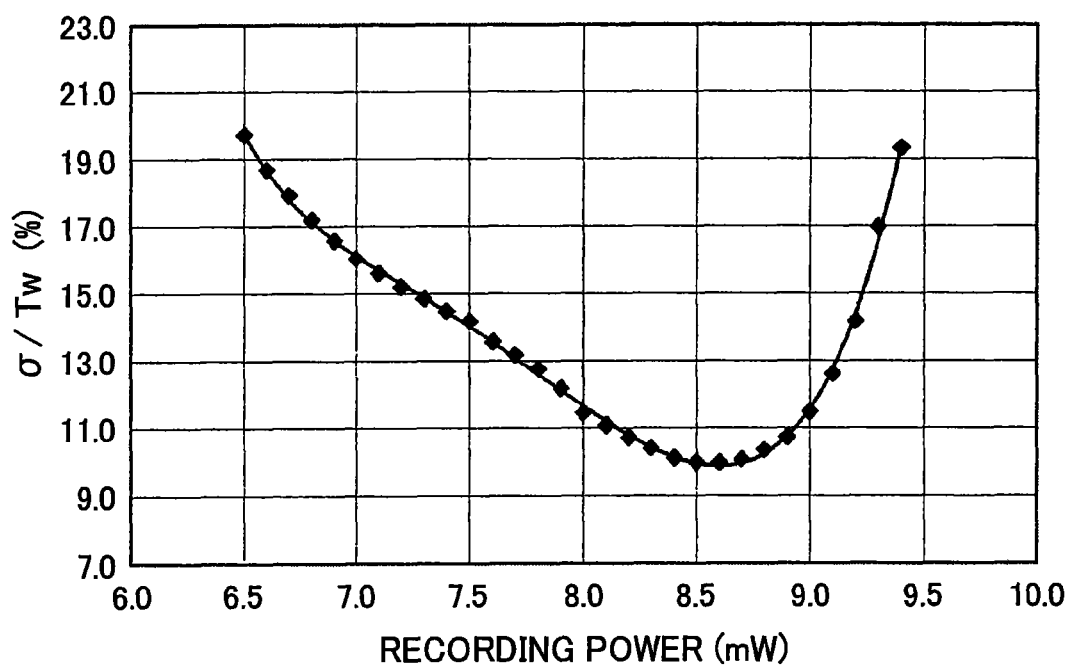
FIG. 9 is a diagram showing results in evaluating changes (e.g. jitter change) by recording in various recording powers, at recorded parts and unrecorded parts of a write-only-read-many optical recording medium according to a third embodiment of the present invention.

Furthermore, FIG. 9 shows the results of evaluating changes of jitter where recording is conducted in various recording powers with the optical recording medium according to the third example of the present invention. The results indicate that satisfactory jitter characteristics can be obtained with the optical recording medium according to the third example of the present invention.

Hence, as described in the foregoing examples, satisfactory recording/reproduction characteristics can be obtained in the blue laser wavelength range by using a pigment, such as those shown in [Formula 1] and [Formula 2], accommodating red laser wavelengths. Furthermore, as shown with the absorption spectrums of the pigments of [Formula 1] and [Formula 2] (See FIGS. 5 and 8), the pigments of the present invention is hardly affected by the wavelengths of the complex refractive index (n, k) since the absorption coefficient in the blue laser wavelength range only changes moderately with respect to the complex refractive index.

Further, the present invention is not limited to these embodiments, but various variations and modifications may be made without departing from the scope of the present invention.

The present application is based on Japanese priority application No. 2002-381401 filed on Dec. 27, 2002, with the Japanese Patent Office, the entire contents of which are hereby incorporated by reference.

What is claimed is:

1. A recording/reproduction method exhibiting a Low-to-High recording property, the method comprising a step of:
    performing a recording/reproduction process on an optical recording medium by using a laser having a wavelength that is no greater than 500 nm;
    wherein the optical recording medium includes a substrate, wherein the substrate has grooves with a groove depth of 55 nm,
    an organic material layer provided on the substrate and having a thickness of 50 nm to 300 nm, the organic material layer having a light absorption function that is sufficient for recording in a recording/reproduction wavelength range,
    a reflection layer provided on the organic material layer and having a thickness of from 50 nm to 300 nm, a heat insulating layer provided adjacent to the organic material layer and having a thickness of from 5 nm to 200 nm, and
    a cover layer;
    wherein an unrecorded part of the optical recording medium is configured to exhibit a reflectivity that is lower than a reflectivity of a recorded part of the optical recording medium and wherein the recording/reproduction characteristics are obtained in a blue laser wavelength range;
    wherein the light absorption function of the organic material layer is provided solely by a material consisting of a single organic material having a first absorption band situated toward a long wavelength side with respect to the recording/reproduction wavelength range,
    a second absorption band that does not belong to the first absorption band, the second absorption band situated in the vicinity of the recording/reproduction wavelength range, and
    a third absorption band situated toward a short wavelength side with respect to the recording/reproduction wavelength range, the third absorption band exhibiting an absorption greater than an absorption of the first absorption band, wherein the third absorption band has a largest absorption wavelength that is no greater than 300 nm,
    wherein the optical recording medium provides low-to-high recording at a recording power range of from 2 mW to 11 mW at a linear recording speed of 6 m/sec.

2. The recording/reproduction method as claimed in claim 1, wherein the heat insulating layer includes any of $SiO_2$, $ZnS.SiO_2$, and $ZrO_2$ as a main component.

3. The recording/reproduction method as claimed in claim 1, wherein the heat insulating layer includes ZnS, $ZrO_2$, $Y_2O_3$, and $SiO_2$.

4. The recording/reproduction method as claimed in claim 1, wherein the heat insulating layer includes $ZrO_2$, $TiO_2$, $SiO_2$, and X, wherein X includes at least one of $Al_2O_3$, MgO, CaO, NbO, $Y_2O_3$, and CeO.

5. The recording/reproduction method as claimed in claim 1, wherein the substrate includes groove parts and land parts, wherein recording areas are formed in both the groove parts and the land parts.

6. The recording/reproduction method as claimed in claim 1, wherein the heat insulating layer comprises a member selected from nitride non-oxides, carbide non-oxides, boride non-oxides, sulfide non-oxides, silicide non-oxides, and carbon non-oxides.

7. The recording/reproduction method as claimed in claim 1, wherein the reflectivity of the recorded part increases continuously as recording power is increased, over a recording power range of from 0.77×Po to 1.13×Po, wherein Po represents a recording power where jitter is minimized.

8. The recording/reproduction method as claimed in claim 1, wherein the reflectivity of the unrecorded part is no greater than 10%.

9. A recording/reproduction method exhibiting a Low-to-High recording property, the method comprising a step of:
    performing a recording/reproduction process on an optical recording medium by using a laser having a wavelength that is no greater than 500 nm;
    wherein the optical recording medium consists essentially of:
    a substrate, a reflection layer, an organic material layer, a light absorption layer, and a cover layer;
    wherein the organic material layer is situated on the substrate and has a thickness of 50 nm to 300 nm, the organic material layer having a light absorption function that is sufficient for recording in a recording/reproduction wavelength range of no more than 500 nm;
    wherein the light absorption layer is situated adjacent to the organic material layer and has a thickness of 5 nm to 150 nm;
    wherein the reflection layer is provided on the organic material layer and has a thickness of from 50 nm to 300 nm; and
    wherein the organic material satisfies a relation of (light absorption function of organic material layer in recording/reproduction wavelength area) <(light absorption function of light absorption layer in recording/reproduction wavelength area);
    wherein an unrecorded part of the optical recording medium is configured to exhibit a reflectivity that is lower than a reflectivity of a recorded part of the optical recording medium;
    wherein the light absorption function of the organic material layer is provided solely by a material consisting of a single organic material having:
    a first absorption band situated toward a long wavelength side with respect to the recording/reproduction wavelength range, a second absorption band that does not belong to the first absorption band, the second absorption band situated in the vicinity of the recording/reproduction wavelength range, and a third absorption band situated toward a short wavelength side with respect to the recording/reproduction wavelength range, the third absorption band exhibiting an absorption greater than an absorption of the first absorption band, wherein the third absorption band has a largest absorption wavelength that is no greater than 300 nm, wherein the optical recording medium provides low-to-high recording at a recording power range of from 2 mW to 11 mW at a linear recording speed of 6 m/sec.

10. The recording/reproduction method as claimed in claim 9, wherein the substrate includes groove parts and land parts, wherein recording areas are formed in both the groove parts and the land parts.

11. The recording/reproduction method as claimed in claim 9, wherein the reflectivity of the recorded part increases continuously as recording power is increased, over a recording power range of from $0.77 \times Po$ to $1.13 \times Po$, wherein Po represents a recording power where jitter is minimized.

12. The recording/reproduction method as claimed in claim 9, wherein the reflectivity of the unrecorded part is no greater than 10%.

* * * * *